United States Patent [19]

Sclafani et al.

[11] Patent Number: 4,791,535
[45] Date of Patent: Dec. 13, 1988

[54] SECURITY DEVICE FOR FOG LIGHTS

[76] Inventors: Vincent J. Sclafani; Daniel Martorano, both of 457 Wilson Blvd., Mineola, N.Y. 11501

[21] Appl. No.: 154,831

[22] Filed: Feb. 11, 1988

[51] Int. Cl.⁴ .......................... E05B 65/12; B60Q 1/20
[52] U.S. Cl. ......................................... 362/82; 362/61; 362/249; 70/232; 70/258; 411/910; 248/551
[58] Field of Search ...................... 362/61, 74, 82, 249, 362/382; 70/285, 232, DIG. 57; 411/910; 248/214, 551; 293/117; 296/1 C; 280/507

[56] References Cited

U.S. PATENT DOCUMENTS

| | | | |
|---|---|---|---|
| 2,202,472 | 5/1940 | Tornblom et al. | 248/551 |
| 3,525,461 | 8/1970 | Bronson | 224/42.1 |
| 3,564,879 | 2/1971 | Bennett | 70/232 |
| 4,028,913 | 6/1977 | Falk | 70/58 |
| 4,228,983 | 10/1980 | Bowman, Jr. | 248/553 |
| 4,353,521 | 10/1982 | Webb | 248/551 X |
| 4,397,499 | 8/1983 | Work et al. | 296/218 |
| 4,495,787 | 1/1985 | Comstock | 70/258 |
| 4,611,379 | 9/1986 | Heitzman | 411/910 X |
| 4,667,995 | 5/1987 | Wilkins | 362/82 X |
| 4,691,891 | 9/1987 | Dionne | 248/551 |

Primary Examiner—Ira S. Lazarus
Assistant Examiner—Richard R. Cole
Attorney, Agent, or Firm—Henderson & Sturm

[57] ABSTRACT

A fog light security apparatus (10) adapted to secure a plurality of fog lights (50) wherein the security apparatus (10) comprises: a base unit (11); a cover unit (12); and a securing unit (13), wherein the securing unit (13) comprises a plurality of securing members (22) adapted to secure the cover unit (12) to the base unit (11); and, wherein the securing members (22) comprise threaded bolt elements (23) having an enlarged head (24) with a specially contoured recess (25) that will only accept a complimentary configured tool (80).

5 Claims, 1 Drawing Sheet

U.S. Patent  Dec. 13, 1988  4,791,535
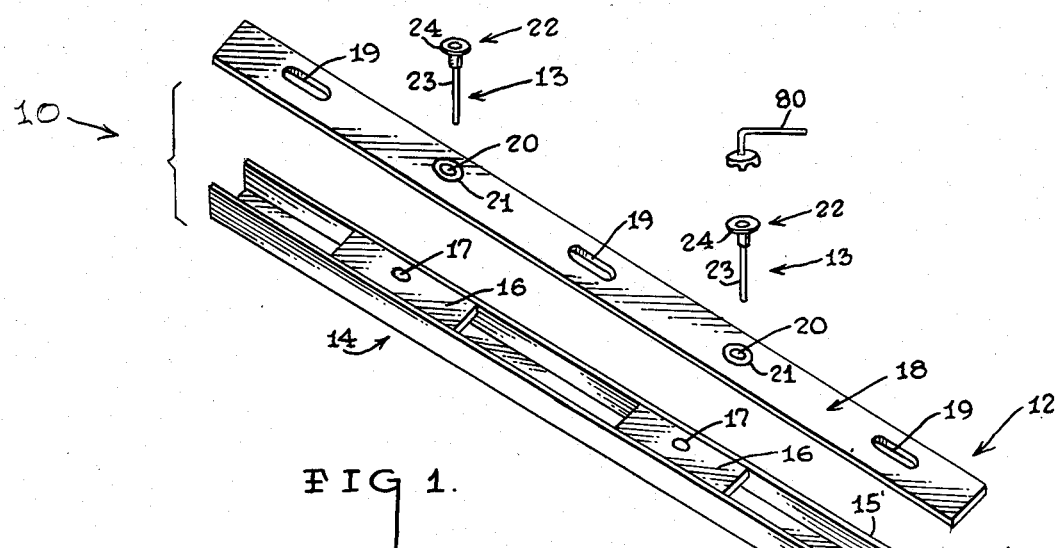
FIG 1.
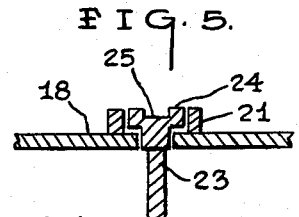
FIG. 2.   FIG. 5.   FIG 4.
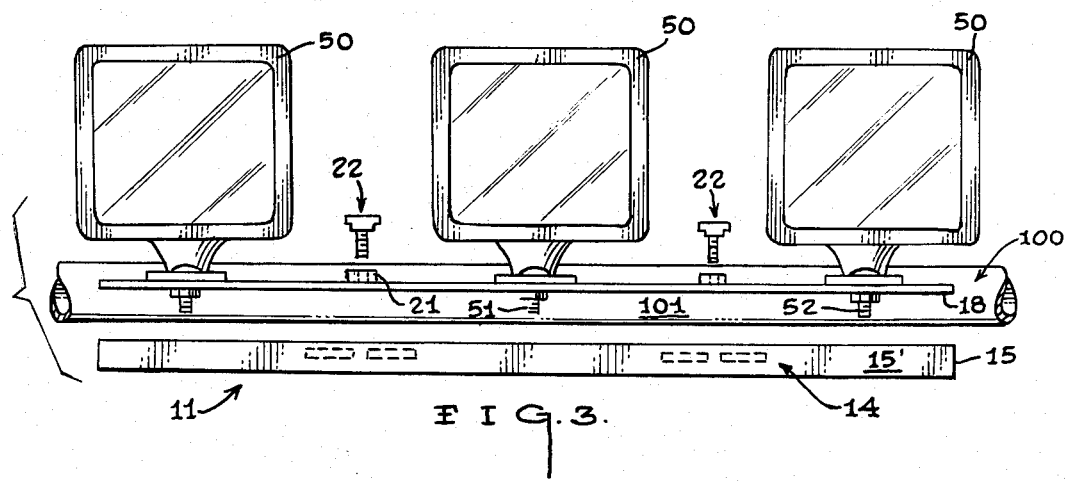
FIG. 3.

4,791,535

SECURITY DEVICE FOR FOG LIGHTS

TECHNICAL FIELD

The present invention relates generally to securing means for fog lights on a vehicle, and more specifically to a locking apparatus to attach fog lights adjacent to the roll bar of a truck or jeep.

BACKGROUND OF THE INVENTION

As can be seen by reference to the following U.S. Pat. Nos. 4,028,913; 3,525,461; 4,495,787; and, 4,397,499 the prior art is replete with myriad and diverse locking devices for motor vehicle accessories.

While the prior art constructions are more than adequate for the purpose and function for which they were specifically designed, none of those constructions address or provide a functional securing means specifically designed to secure fog lights.

Fog lights are one of the most complimenting accessories that may be added to a truck and/or jeep; however, they are one of the most vulnerable items subject to theft as well, due to their exposed location on a vehicle. Most fog light constructions are nominally secured to a vehicle by a simple nut and bolt arrangement, and may be easily removed by unauthorized persons.

Obviously, there has been a long standing need for a fog light security device for motor vehicles which incorporates both widespread adaptability and a high level of security in its design and structure. The development of such a device is the stated purpose and objective of the present invention.

BRIEF SUMMARY OF THE INVENTION

The fog light securing apparatus that forms the basis of the present invention comprises in general a protective unit and a securing unit. The protective unit comprises in general a guard member and a plurality of anchoring members; wherein the guard member is adapted to cover and prevent access to the standard fog light attachment bolts; and, wherein the anchoring members are adapted to secure the guard member in place.

The securing unit comprises in general an extended cover plate member and a plurality of security bolt members; wherein, the cover plate member will mount using the regular fog light bolts, and allow the security bolts to attach the guard unit in a protective configuration around the fog light bolts. The security bolts comprise an otherwise typical bolt configuration with the exception that the head of the bolt will only accept a special wrench or key to effect the removal of the bolt.

Additionally, a cover plate member is provided with bolt head wells to protect the security bolts from forced removal.

Briefly stated, the aforementioned arrangement allows for the guard member to be securely attached to the cover plate; whereby the fog light bolts, and consequently the fog lights themselves will be protected from unauthorized removal.

BRIEF DESCRIPTION OF THE DRAWINGS

These and other objects, advantages, and novel features of the invention will become apparent from the detailed description of the best mode for carrying out the preferred embodiment of this invention which follows, particularly when considered in conjunction with the accompanying drawings; wherein:

FIG. 1 is an exploded perspective view of the fog light security apparatus of this invention;

FIG. 2 is an end view of the apparatus;

FIG. 3 is an exploded front plan view of the apparatus;

FIG. 4 is a top plan view of the securing unit of the invention; and,

FIG. 5 is a cross-sectional view taken thru line 5—5 of FIG. 4.

BEST MODE FOR CARRYING OUT THE INVENTION

As can be seen by reference to the drawings and in particular to FIG. 1, the fog light security apparatus that forms the basis of the present invention is designated generally by the reference numeral (10). The apparatus (10) comprises in general a base unit (11) a cover unit (12) and a securing unit (13). These units will now be described in seriatim fashion.

As shown in FIG. 1, the base unit (11) comprises an elongated guard member (14) including a generally U-shaped rigid channel element (15) having a plurality of plate elements (16) disposed at spaced locations along the length of the channel element (15). In addition, each of the plurality of plate elements (16) extend between the legs (15') of the channel element (15); and, are further provided with a threaded central aperture (17), whose purpose and function will be described in greater detail further on in the specification.

As can also be appreciated by reference to FIG. 2, the cover unit (12) comprises a rigid and elongated generally flat rectangular cover plate member (18) dimensioned to fit over and rest on the legs (15') of the channel element (15) of the base unit (11). In addition, the cover plate member (18) is further provided with a plurality of elongated apertures (19) and a plurality of generally circular apertures (20) provided with protective grommet collars (21); wherein, the plurality of generally circular apertures are spaced and dimensioned so as to be in axial alignment with the threaded apertures (17) in the base unit (11) when the base (11) and cover (12) units are disposed in their assembled relationship.

As best depicted in FIGS. 1, 4, and 5, the securing unit (13) comprises a plurality of securing members (22) that are adapted to be operatively received in both the circular apertures (20) in the cover unit (12), and the threaded apertures (17) in the base unit (11) to effectively connect these units (11) and (12) together in their assembled relationship. In addition, the securing members (22) further comprise an elongated threaded bolt element (23) having an enlarged bolt head (24) provided with a specially contoured bolt head recess (25). Furthermore, the bolt head recess (25) is configured such that it will only accept a complimentary configured tool (80) such as a key or torque head to effect the threaded engagement between the securing members (23) and the threaded apertures (17) in the base unit (11). As a consequence someone who does not possess such a specialized torque head would not be capable of disassembling the security apparatus (10).

As mentioned earlier on in the specification, the security apparatus (10) of this invention was specifically developed to provide a safe and secure means of mounting a plurality of halogen fog lights (50) to an exterior portion (100) of a vehicle such as a roll bar (101) or the vehicle roof (102). As shown in FIGS. 2 and 5, the typical mounting arrangement for a fog light (50) involves a threaded stem (51) which depends downwardly from the fog light body (50'); wherein, the threaded stem (51) is further provided with a conventional locking nut (52) that cooperates with the threaded stem (51) in a well recognized fashion.

To install the fog lights (50) on the security apparatus (10) the threaded stems (51) of the fog lights (50) are inserted through selected ones of the plurality of elongated apertures (19) in the cover plate member (18); wherein, the fog lights (50) are then positioned at a desired location along the length of the elongated apertures (19). At this point the conventional locking nuts (52) are then engaged with the threaded stem (51) to operatively secure the fog lights (50) to the cover unit (12). Then the cover unit (12) is operatively secured to the base unit (11) by the insertion of the securing members (22) through the cover unit (12) followed by the subsequent engagement of the securing members (23) with the threaded apertures (17) in the base unit (11).

Given the fact that the securing members (23) require a special tool to assemble the apparatus (10), it will likewise be necessary to use such a specialized tool to disassemble the apparatus (10) to gain access to the locking nuts (52) that operatively engage the fog lights (50) to the apparatus.

In addition, it should be noted that in keeping with the teachings of this invention, the base unit (11) must be fixedly secured to a portion (100) of a vehicle exterior; and, this fixed securement can be accomplished by attaching either the bottom (15") of the base unit (11) to the roof (102) of a vehicle (100); or, attaching one of the sides (15') of the base unit (11) to the vehicle roll bar (101), such as by welding, bolting, or the like.

It should also be noted that in most instances the vehicle roll bar (101) comes equipped with an apertured mounting perch (103) that is specifically designed to receive the threaded stem (51) and locking nut (52) of the fog light (50); and, in these instances the side (15') of the base unit (11) would not have to be fixedly secured to the roll bar (101) in order to practice this invention.

Having thereby described the subject mater of this invention it should be obvious that many substitutions, modifications, and variations of the invention are possible in light of the above teachings. It is therefore to be understood that the invention as taught and described herein is only to be limited to the extent of the breadth and scope of the appended claims.

We claim:

1. A fog light security apparatus in combination with a plurality of fog lights wherein each of said plurality of fog lights is provided with a downwardly depending threaded stem and a locking nut and said security apparatus comprises:
   a base unit comprising an elongated guard member including a generally U-shaped rigid channel element having a plurality of plate elements provided with threaded apertures;
   a cover unit comprising a rigid elongated cover plate member dimensioned to fit over the channel element of the base unit and provided with a plurality of elongated apertures that are dimensioned to receive the threaded stems of said plurality of fog lights; and,
   a securing unit adapted to operatively secure said base unit to said cover plate unit.

2. The security apparatus as in claim 1; wherein, said cover unit further comprises:
   a plurality of circular apertures that are aligned with the threaded apertures in the plate elements of the base unit wherein the said circular and said threaded apertures are dimensioned to operatively receive the securing unit.

3. The security apparatus as in claim 2; wherein, the securing unit comprises:
   a plurality of securing members that comprise elongated threaded bolt elements having enlarged bolt heads wherein each of the plurality of bolt heads are provided with a specially contoured bolt head recess.

4. The security apparatus as in claim 3; wherein, the specially contoured bolt head recesses in the plurality of securing members are dimensioned such that they will only receive a complimentary configured tool.

5. The security apparatus as in claim 4; wherein, the cover unit further comprises:
   a plurality of grommet collars which surround said plurality of circular apertures.

* * * * *